Oct. 18, 1966   J. W. BELL ETAL   3,279,492
LUBRICATED PLUG VALVE ASSEMBLIES
Original Filed Nov. 30, 1959   5 Sheets-Sheet 1
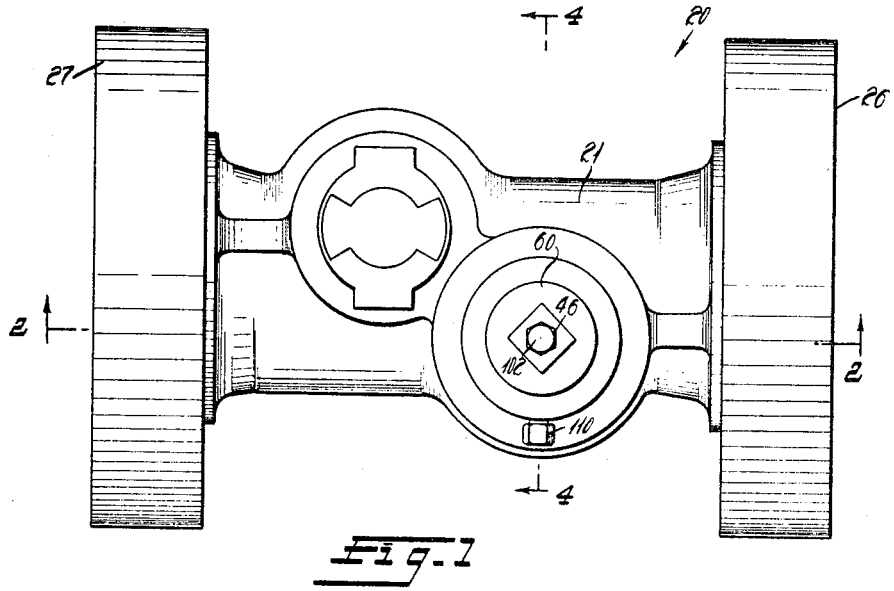
Fig. 1
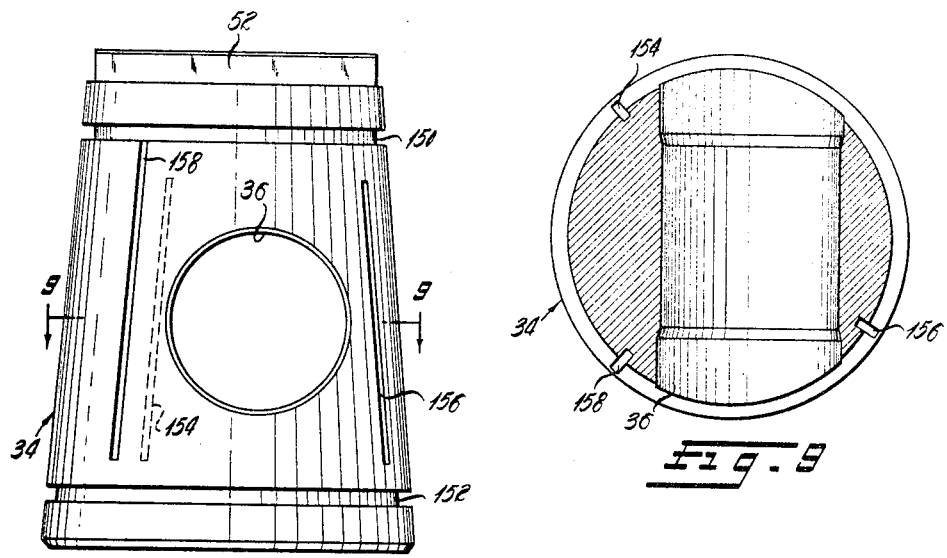
Fig. 8
Fig. 9
INVENTORS
JOE W. BELL
HERMAN H. FOWLER
BY Strauch, Nolan & Neale
ATTORNEYS

INVENTORS
JOE W. BELL
HERMAN H. FOWLER

BY Strauch, Nolan & Neale
ATTORNEYS

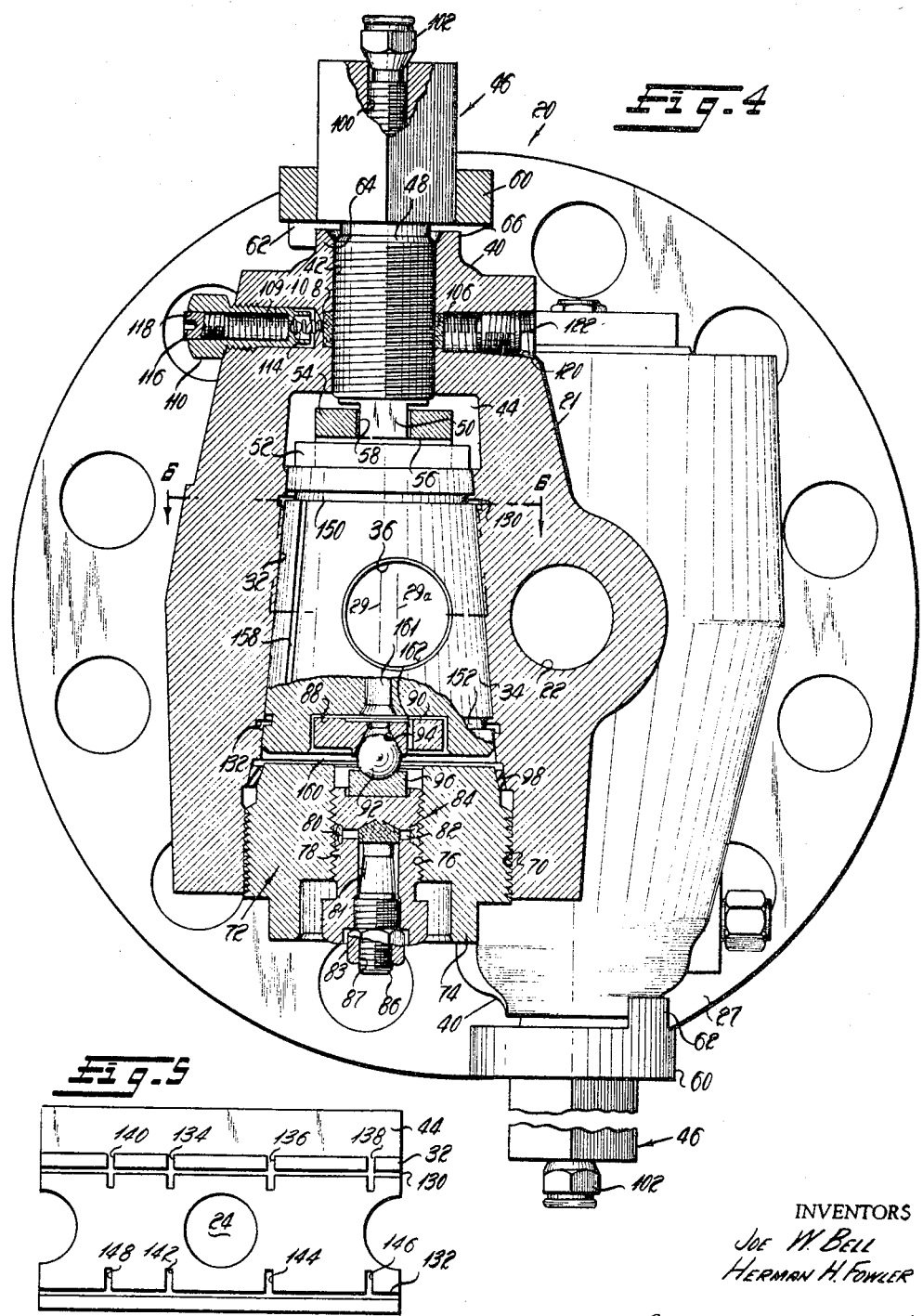

Oct. 18, 1966   J. W. BELL ETAL   3,279,492
LUBRICATED PLUG VALVE ASSEMBLIES
Original Filed Nov. 30, 1959   5 Sheets-Sheet 5
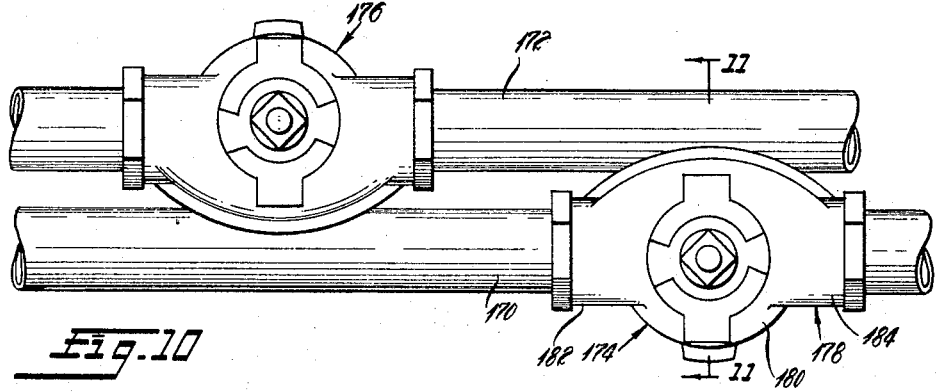
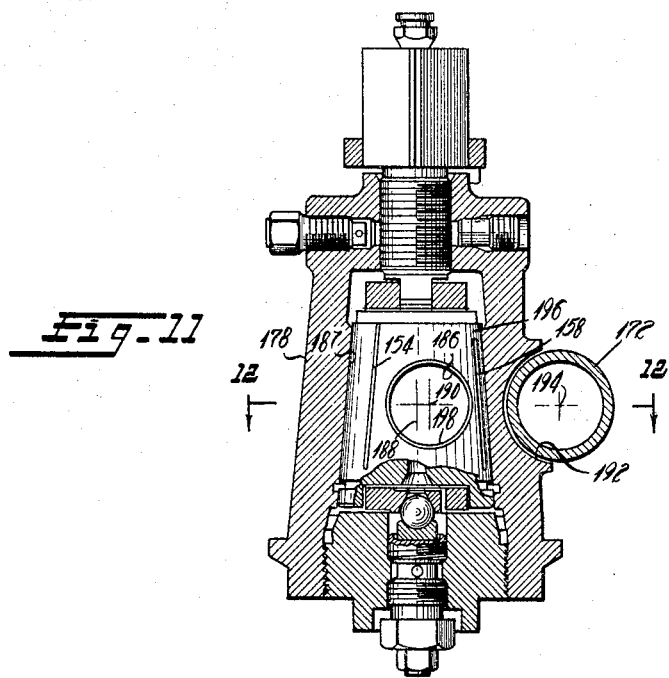
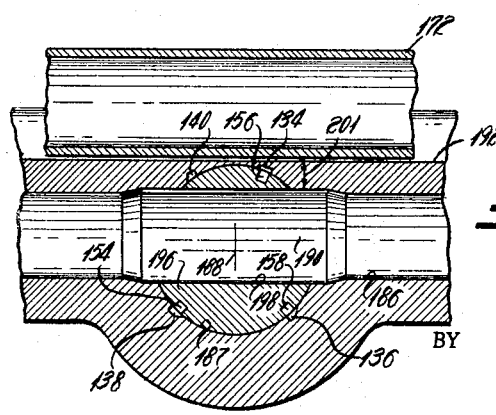
INVENTORS
JOE W. BELL
HERMAN H. FOWLER
BY Strauch, Nolan + Neale
ATTORNEYS

United States Patent Office 3,279,492
Patented Oct. 18, 1966

3,279,492
LUBRICATED PLUG VALVE ASSEMBLIES
Joe W. Bell, Sulphur Springs, Tex., and Herman H. Fowler, Kearney, Nebr., assignors to Rockwell Manufacturing Company, Pittsburgh, Pa., a corporation of Pennsylvania
Original application Nov. 30, 1959, Ser. No. 856,265, now Patent No. 3,139,906, dated July 7, 1964. Divided and this application Apr. 4, 1962, Ser. No. 185,164
10 Claims. (Cl. 137—246.14)

This is a division of Serial No. 856,265, filed November 30, 1959, for Valve Assemblies, and since matured into U.S. Letters Patent No. 3,139,906, dated July 7, 1964.

The present invention relates to valves and more particularly to dual completion plug valve assemblies as used in Christmas tree constructions or other well-completion equipment.

A preferred application of the present invention is in connection with dual completion oil or gas wells having parallel nonconcentric tubing strings wherein the dual tubing strings are positioned parallel and close together in the well in order to obtain production from different strata. It is desirable to maintain the tubings strings thus relatively positioned and as close together as possible in the lower well head and the upper well head or Christmas tree structure to reduce the costs of drilling and also in order that formation testing tools and the like may be introduced into the tubing strings through the well head and Christmas tree equipment.

It will be appreciated, however, that the minimal lateral distance between the centerlines of the parallel tubing strings is limited by the well head valve structures interconnecting the Christmas tree structure or upper well head with the lower well head or well casing for controlling fluid flow through the tubing strings. This is so because the well head valves controlling the flow of fluid through the tubing strings must be constructed to withstand well pressures and also must be capable of non-interfering valve operation.

In the past it has been the custom to control the fluid flow through the parallel tubing strings by a conventional dual completion plug valve assembly wherein the valve body is formed with straight parallel spaced axial through passages separated by a common wall. The valve assembly is generally mounted between a tubing string head mounted on the well casing and the upper Christmas tree casing and is connected to the tubing strings so that the through flow passages in the valve body are coaxial with the tubing strings and the flow passages formed in the upper Christmas tree casing. The axial through passages of the valve body are intersected at right angles at different levels by valve plug seating cross bores aligned with the center line of the through passages and, consequently, the tubing strings. A conventional valve plug wherein the axis of plug rotation aligns with the axis of the plug port is rotatably mounted on each of the seating surfaces provided by the cross bores so that each plug has its rotational axis and through port axis in alignment with its associated cross bore and through passage for controlling the flow of fluid therethrough.

The minimum lateral distance obtainable between the center lines of the fluid flow passages in the conventional dual plug valve body and consequently the tubing strings for a given internal fluid flow passageway diameter is principally determined by the thickness of the common wall separating the passages which has a critical minimal thickness in a plane passing through the longitudinal axes of both passages and measured transverse to the longitudinal axes of the cross bores. The thickness of the common wall in this plane, it will be appreciated, is reduced by the formation of the valve seating cross bore and consequently the smallest critical common wall thickness corresponds to the distance between opposed wall surfaces of the common wall measured in this plane laterally along the transverse axis of one of the cross bores. This minimum critical common wall thickness must always be of such magnitude to safely withstand the maximum well pressures to which the valve is to be subjected. It is equally clear that the fixed lateral distance between the axis of one cross-bore associated with one passage and the longitudinal axis of the other through passage therefore corresponds to the radius of the cross bore measured in the plane passing through the longitudinal axes of both through passages, plus the critical common wall thickness measured laterally in this plane along the transverse axis of the cross bore, and plus the radius of the other through passage.

In the valve body of a conventional dual-completion plug valve as described above, the axis of the cross bore is coincident with the longitudinal axis of its associated through passage. Consequently, lateral distance between the axes of the through passages in the conventional valve body and, therefore, the axes of the tubing strings is fixed by the radius of the cross bore intersecting one through passage, the critical common wall thickness and the radius of the other through passage, all measured laterally in a plane passing the longitudinal axes of both through passages.

The structure incorporating the preferred embodiment of the invention is illustrated as a dual plug valve assembly for controlling the flow of fluid through the lower well head tubing strings wherein the through flow passages of the valve body are positioned closer together to thereby facilitate a closer positioning of the tubing string while at the same time maintaining coaxial alignment of the valve body flow passages with the tubing strings. This is accomplished essentially by laterally offsetting the rotational axis of the plug outwardly from the longitudinal axis of its associated through flow passage and away from the common dividing wall so as to reduce the depth of the recess formed in one side of the valve body as a result of machining the seating bore by the amount of offset. By this structure, the lateral distance between the axes of the through flow passages in the valve body and between the axes of the tubing strings is equivalent to the fixed lateral distance in a conventional dual plug valve less the amount of offset of each plug. Thus, the lateral distance between the through flow passages is reduced by an amount corresponding to the offset of the cross bore and the valve plug so as to enable the tubing strings to be correspondingly moved closer together.

In order to maintain an alignment of the plug port with the valve body flow passage, the preferred embodiment comprises a further associated feature in that the through ports of the laterally offset plugs are laterally offset with respect to the axis of rotation of the plug toward the common dividing wall so that the plug ports axially align with the through fluid flow passages of the valve body when the plug is in open position. By this construction, parallel axial passages are provided from the tubing strings in the lower well head to the upper well head Christmas tree structure.

The present application claims novel plug valve and associated seating surface grooving arrangements per se and in the novel dual completion valve assembly.

The major object of this invention is to provide a plug valve assembly having novel lubricant grooving in the plug and body seating surfaces.

Another object of the present invention is to provide a novel lubricated plug valve assembly having a rotatable ported plug wherein a set of longitudinal grooves are provided including a single long longitudinal groove in constant communication with a lubricant chamber and remaining unexposed to line fluid throughout normal plug rotation and two short longitudinal grooves are adapted to be connected to the lubricant chamber at fully opened and fully closed valve positions only.

Still a further object of the present invention is to provide a novel plug valve assembly having a body and a plug rotatably mounted in a valve body seating bore about an axis that is laterally offset with respect to the longitudinal axis of a through fluid flow passage intersecting the seating bore wherein the valve body and plug seating surfaces are provided with special lubricant grooving.

Another object of the present invention is to provide a novel plug valve assembly that is lubricated and is adapted to rotate an angular distance of more than 90° between fully opened and fully closed positions and incorporates special lubricant passages.

Further objects of the invention will presently appear as the description proceeds in connection with the appended claims and the annexed drawings wherein:

FIGURE 1 is a plan view showing a plug valve assembly according to one embodiment of the present invention;

FIGURE 4 is an enlarged sectional view along line 4—4 of FIGURE 1;

FIGURE 5 is a developed view of the valve body seating surface for the plug valve assembly illustrated in FIGURE 1, showing lubricant grooving;

FIGURE 8 is an enlarged elevational view of a valve plug for the valve assembly illustrated in FIGURE 1, showing the plug surface grooving;

FIGURE 9 is a section substantially along line 9—9 of FIGURE 8;

FIGURE 10 is a plan view showing a plug valve assembly according to a further embodiment of the present invention;

FIGURE 11 is a section substantially along line 11—11 of FIGURE 10; and

FIGURE 12 is a section substantially along line 12—12 of FIGURE 11.

Figure 3:
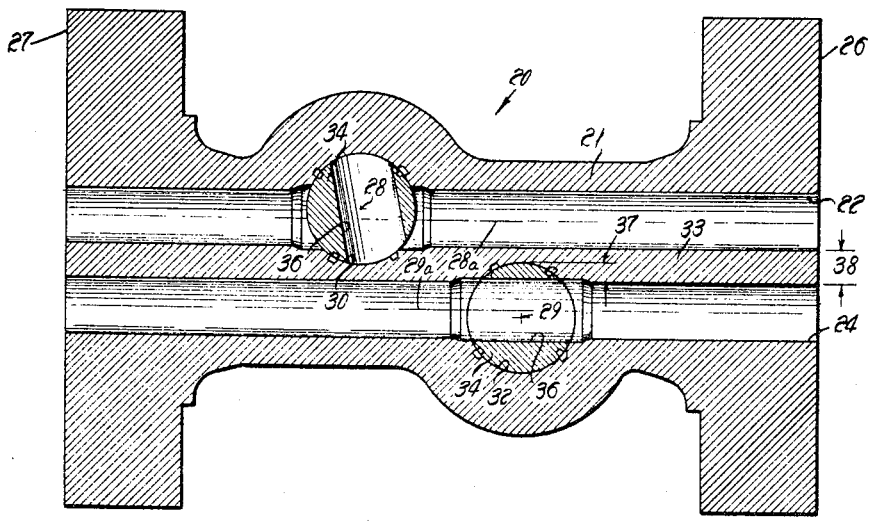
FIGURE 3 is a section substantially along line 3—3 of FIGURE 2.
Figure 2:
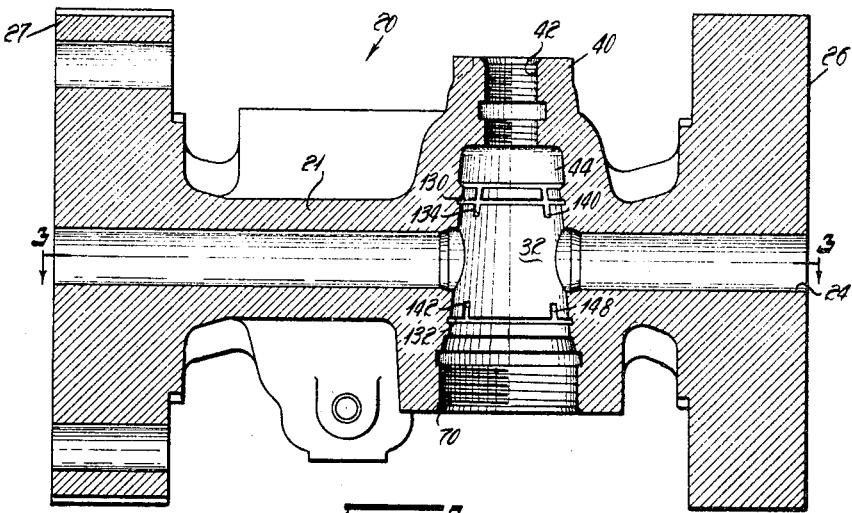
FIGURE 2 is a section substantially along line 2—2 of FIGURE 1 illustrating the valve body with the valve plug removed.

Referring now to the drawings, and more particularly to FIGURES 1–3, the reference numeral 20 generally designates a dual completion plug valve assembly comprising a valve body 21 formed with spaced parallel axial through fluid flow passages 22 and 24 and having end flanges 26 and 27 by which valve 20 is adapted to be fixedly secured at its lower end to lower well head equipment (not shown) and at its upper end to an upper well head or Christmas tree structure (not shown). As best shown in FIGURES 2 and 3, the fluid flow passages 22 and 24 are respectively intersected at different levels and at right angles by tapered valve seating bores 30 and 32 which are both open at their opposite ends. In accordance with the present invention, the longitudinal axes 28 and 29 of the bores 30 and 32 are laterally and outwardly offset with respect to the longitudinal axes 28a and 29a of their respective fluid flow passages 22 and 24 so that axes 28a and 29a are closer to the common wall portion 33 dividing passages 22 and 24.

The two sides of the valve 20 are identical, and the detailed description will be limited to only one side but will be equally applicable to both. Identical reference numerals refer to identical elements of the valves on both sides.

Thus, with reference to FIGURES 1–4, a tapered valve plug 34 is rotatably seated on the conical surfaces provided by each of the valve seating bores 30 and 32 and is provided with a diametrical through port 36 shown in its fully open position in FIGURE 4 and adapted to be rotated 100° to a fully closed position about an axis coincident with longitudinal bore axis 29. The through port 36 of each valve plug 34, in accordance with the present invention, is offset laterally and inwardly with respect to the axis of plug rotation by a magnitude equal to the offset of the plug axis.

By this construction, each port 36 is positioned so as to axially align with its associated fluid flow passage 22 or 24 when the plug is rotated to its valve open position to thereby establish uninterrupted coaxial continuations of passages 22 and 24. Thus, it will be appreciated that by laterally offsetting the longitudinal axes of cross bores 30 and 32 outwardly from the axes of their respective fluid flow passages 22 and 24, the lateral dimension 37 (FIGURE 3) of the recess formed in common wall 33 by the formation of each cross bore is reduced by a magnitude corresponding to the offset of the cross bores. This serves to reduce the over-all lateral thickness of common wall portion 33 between the passages 22 and 24 as indicated at 38 (FIGURE 3) thereby permitting the passages 22 and 24 to be more closely spaced together. The tubing strings (not shown) in the lower well head (not shown), to which valve assembly 20 is adapted to be secured, axially align with passages 22 and 24 and are thereby correspondingly more closely spaced together in the well. This, among other advantages, serves to reduce the minimal diameter of the well hole to be drilled for accommodating the lower well head and the tubing strings.

By offsetting the through ports 36 of valve plugs 34 with respect to the plug rotational axis so as to coaxially align with the fluid flow passages 22 and 24, it is equally clear that parallel uninterrupted axial fluid flow passages are obtained extending from the upper well head Christmas tree structure (not shown) and through the valve assembly and lower well head.

As best shown in FIGURE 4, valve body 21 at the smaller end of each of cross-bores 30 and 32 is extended at 40 and has a threaded hole 42 bored and tapped therethrough extending from the exterior of the valve to the lubricant chamber 44 provided at the smaller end of the plug 34. An operating valve stem 46 squared at its outer end has a threaded portion 48 extending through bore 42 coaxial with the rotational axis of plug 34 and is provided at its inner end with a tongue or extension 50, the purpose of which will hereinafter appear. The threaded porton 48 of stem 46 has accurately machined running threads which cooperate with the threads in the wall of hole 42.

Tapered plug 34, forming one wall of lubricant chamber 44, extends partly into this chamber and is connected to stem 46 by an Oldham type coupling comprising a tongue 52 integrally formed at its smaller end. An equalizer block 54 having a diametrical groove 56 shaped correspondingly to the tongue 52 projecting into groove 56. A hole 58 of generally rectangular shape is formed axially through equalizer 54, and in assembled position the tongue 50 of stem 46 is freely received in hole 58 with a small amount of play.

With continued reference to FIGURE 4, an indicator stop collar 60 is fixedly secured to the squared end of stem 46 by any suitable means and a stop lug 62 integrally depending from collar 60 cooperates with stop-abutment members 64 and 66 on valve body 21 to limit rotation of the valve plug 34 to a turn of 100°.

At the larger end of plug seating bore 32, valve body 21 is provided with a threaded bore 70 formed coaxially with tapered bore 32 as best shown in FIGURE 4. A threaded plug or closure member 72 threadedly engaged in bore 70 has a non-circular end 74 extending beyond valve body 21 by which it may be rotated by a wrench or the like. The threads at the joint between the closure plug 72 and the valve body 21 are preferably of the type having at least one face substantially normal to the axis of the plug 72 with the apex angle thereof being received as required.

Threaded plug 72 has a central threaded bore 76 in which is threaded a plug adjustment screw member 78, the threaded joint between the plug and adjustment screw being sealed by packing in a suitable annular groove or recess 80. Packing is supplied to the annular packing groove 80 through a bore 81 and radial ducts 82 in adjustment screw 78. A check valve fitting 83 is threaded into bore 81 and carries a spring pressed ball check valve (not shown) to prevent refluxing of the packing. The packing in recess 80 is compressed by means of a plunger 86 threaded into a hole 87 in check valve fitting 83.

The larger end of valve plug 34 is formed with a recess 88 in which a plate 90 is suitably supported to engage a thrust ball 92. Thrust ball 92 is held in position in a conical recess 94 in plate 90 by a thrust disc 96 bearing against adjustment screw 78 whereby rotation of the screw 78 adjusts the seating pressure of plug 34 on its seat.

By this construction it will be appreciated that the larger end of the seat is closed by the threaded plug 72 and is sealed by a tapered ring gasket 98 compressed between the upper beveled end of threaded plug 72 and valve body 21.

In order to seal and lubricate the surfaces between valve plug 34 and the body, a suitable lubricant is introduced into chamber 44 through the operating stem 46 which is provided with a threaded bore 100 extending axially therethrough and in which a suitable check valve fitting (not shown) is located to prevent reflux of lubricant. A threaded screw 102 is threadedly engaged in bore 100 at the exposed end of the stem 46. This screw 102 when rotated in the bore 100 functions to exert pressure on lubricant in bore 100 to thereby push it through the check valve (not shown) and chamber 44 to the plug valve seating grooves to be described.

Because of a close sealing fit provided between the stem threaded section 48 and the threaded bore 42 outward flow of lubricant from chamber 44 is resisted so that the lubricant between these threads form a primary seal.

At the smaller end of the plug 34, a secondary seal comprising a packing chamber 106 containing packing 108 under pressure around the threaded section 48 of stem 46 is provided to prevent outward escape of lubricant. Any suitable fibrous packing material can be used for this purpose, such as a stiff mixture of lubricant, graphite or asbestos, or the like. Packing is supplied to the packing chamber 106 through a passage 109 in the side of valve body 21. A check valve fitting 110 threaded into the passage 109 carries a spring pressed check valve 114 to prevent refluxing of packing therefrom. A threaded compression plunger 116 threaded into a bore 118 in the check valve fitting 110 serves to compress the packing in passage 109 and supply it to the packing chamber 106. A bore 120 into which a pipe plug 122 is threadedly engaged communicates with packing chamber 106 opposite passage 112 to provide for removal of packing from chamber 106.

In order to supply and distribute lubricant over the seating surfaces of the body and plug 34 from the chamber 44, the plug seating bore 32 is provided with parallel circumferential grooves 130 and 132, one adjacent each end of the plug 34 as best shown in FIGURES 2 and 5. Circumferential groove 130 adjacent the smaller end of plug 34 is always connected to the lubricant chamber 44 by a series of four circumferentially spaced longitudinally extending dwarf grooves 134, 136, 138 and 140 (FIGURE 5) provided in the seating surface 32 of the valve body 21 and extending downwardly beyond groove 130.

Figure 6:
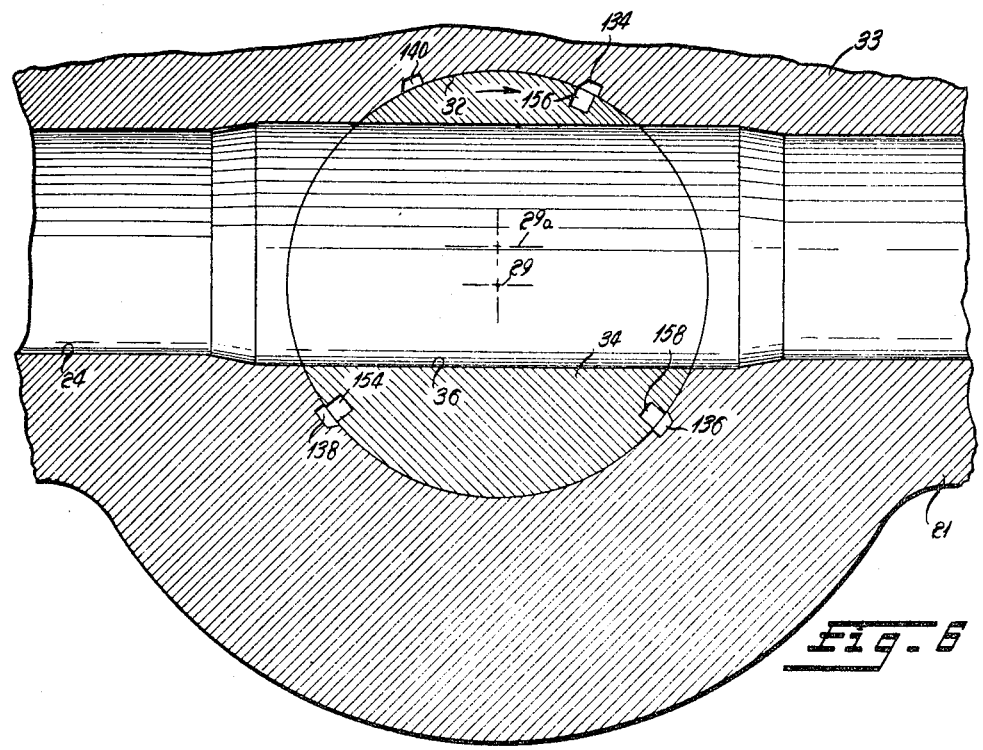
FIGURE 6 is an enlarged fragmentary sectional view substantially along line 6—6 of FIGURE 4 and showing the valve plug in fully opened position.

Referring now to FIGURES 2, 5 and 6, dwarf grooves 136 and 138 are located on the side of the fluid passage 24 nearest to the rotational axis 29 of the plug and are spaced 100° apart. Dwarf grooves 134 and 140 located on the other side of passage 24 are respectively spaced 100° from dwarf grooves 136 and 138 so that the angular distance between grooves 134 and 140 is substantially 60°. Both dwarf grooves 136 and 138 are angularly spaced 40° from an axis passing through the rotational center of the plug and extending parallel to the longitudinal axis of passage 24.

Annular groove 132 adjacent the larger end of the plug 34 connects to a series of four upwardly extending dwarf grooves 142, 144, 146 and 148 (FIGURES 2 and 5) provided in the seating surface 32 and respectively aligned with the dwarf grooves 134, 136, 138 and 140 adjacent the smaller end of plug 34.

Referring now to FIGURES 4, 8 and 9, a circumferential groove 150 is provided in plug 34 adjacent the smaller end thereof directly opposite circumferential groove 130. Plug 34 is provided with a further circumferential groove 152 adjacent the larger end thereof and directly opposite circumferential body groove 132. Between annular grooves 150 and 152, a series of two short longitudinal grooves 154 and 156 and a long longitudinal groove 158 are provided in the plug surface. As best shown in FIGURE 8, short longitudinal grooves 154 and 156 terminate short of both annular grooves 150 and 152 while long longitudinal groove 158 connects to upper annular groove 150 and terminates short of lower annular groove 152.

With continued reference to FIGURES 8 and 9, long longitudinal groove 158 and short longitudinal groove 154 are located on the side of the plug port 36 nearest to the rotational axis of the plug and are spaced 100° apart. Grooves 154 and 158 are respectively positioned adjacent opposed ends of plug port 36 so as to overlap grooves 138 and 136 in seating surface 32 when port 36 aligns with passageway 24 in valve open position. The other short longitudinal groove 156 is located on the opposite side of plug port 36 from grooves 154 and 158 and is spaced 100° from the long longitudinal groove 158 so that long groove 158 is spaced equiangularly between the two short grooves 154 and 156.

Referring now to FIGURE 6, the valve is shown in opened position wherein long longitudinal plug groove 158 overlaps dwarf grooves 136 and 144. Short longitudinal plug groove 154, in valve open position, overlaps dwarf grooves 138 and 146, while short plug groove 156 overlaps dwarf grooves 134 and 142.

Figure 7:
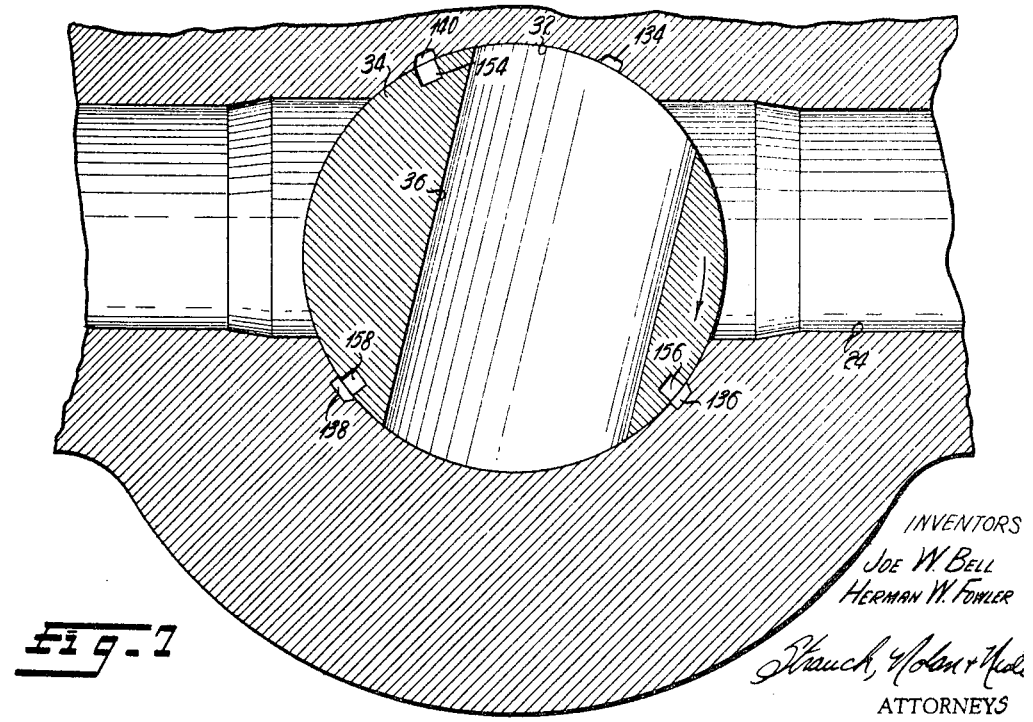
FIGURE 7 is a view similar to FIGURE 6 but showing the valve plug in fully closed position.

Assuming the direction of flow to be as shown by the arrow in FIGURE 7, to close the valve plug 34 is rotated in a clockwise direction as best shown in FIGURE 7, and reaches fully closed position after rotating 100°. Now long longitudinal groove 158 overlaps dwarf grooves 138 and 146. In this position, short groove 154 overlaps dwarf grooves 140 and 148 and short groove 156 overlaps dwarf grooves 136 and 144.

During rotation of valve plug 34 between open and closed positions, it will be appreciated that short longitudinal grooves 154 and 156 are exposed to line fluid in passing from one position to the other position. These short grooves 154 and 156, however, are disconnected from their associated dwarf grooves and therefore from the lubricant chamber 44 during rotation of the plug and are only connected to the lubricant chamber 44 when the valve is in fully open or fully closed positions. This serves to prevent escape of pressurized lubricant from the chamber 44 at such times when longitudinal grooves 154 and 156 are exposed to line fluid. Further, it will be seen by reference to FIGURES 6 and 7 that long longitudinal groove 158, which is continually connected to lubricant chamber 44, moves only along valve plug seating surface 32 on one side of the passage 24 and is not exposed to direct impingement of line fluid in passing between open and closed valve positions.

With continued reference to FIGURES 6 and 7, it will be appreciated that as a result of laterally offsetting the rotational axis of plug 34 from the axes of port 36 and the passage 24, plug port 36 is in constant communication with the upstream end of passage 24 both in opened and closed positions.

As best shown in FIGURE 4, a chamber 160 is formed at the larger end of plug 34 between plate 90 and closure plug 72. Passages 161 and 162 in plug 34 and plate 90 respectively may be provided, connecting port 36 with chamber 160 to prevent the entrapment of incompressible lubricant or line fluid in chamber 160 which would interfere with jacking the plug from its seat. These passages 161 and 162 permit the escape of incompressible fluid from chamber 160 when plug 34 is jacked from its seat by lubricant pressure, and may be omitted under certain conditions.

In operation of the valve, one or more sticks of lubricant are introduced into threaded bore 100 in stem 46 and lubricant is forced by rotation of threaded screw 102 into lubricant chamber 44 until the chamber is filled. Since dwarf grooves 134, 136, 138 and 140 always communicate with lubricant chamber 44, they also become filled with lubricant. Lubricant is transmitted from dwarf grooves 134, 136, 138 and 140 of circumferential grooves 130 and 150 and then to long longitudinal plug groove 158 which is connected to circumferential groove 150. Lubricant from lubricant chamber 44 also flows between threads 42 and 48 to seal stem 46 and to prevent binding thereof.

The adjustment screw member 78 is adjusted to develop the proper seating thrust on the plug 34 and sufficient pressure can be developed on the lubricant in chamber 44 to jack the plug from its seat when required.

As shown in FIGURE 6, the valve is in open position and lubricant is transmitted through dwarf grooves 134, 136, and 138 to longitudinal plug grooves 154, 156 and 158. Lubricant passes from the longitudinal plug grooves through overlapping dwarf grooves 142, 144 and 146 (FIGURE 5) to the lower circumferential grooves 132 and 152. An increase in lubricant pressure in chamber 44 and in the grooves in the plug and body seating surfaces will result in axial displacement of plug 34 relative to the tapered bore.

In order to close the valve, stem 46 is turned clockwise as viewed from FIGURES 6 and 7 and the thrust of tongue 50 against the walls of groove 58 in equalizer 54 is transmitted by the tongue and groove connection 52 and 56 to the plug, the turning force being centered and balanced by the equalizer.

While turning plug 34, short longitudinal grooves 154 and 156 are disconnected from the source of lubricant by reason of their separation from dwarf grooves 134 and 138. Thus, exposure of grooves 154 and 156 to line fluid does not wash lubricant out of any part of the lubricant system other than the grooves 154 and 156, which may be readily refilled when the plug is in either fully open or fully closed position.

In fully closed position, as shown in FIGURE 7, passage 24 is surrounded by a substantially complete seal in substantially the same way as in the full open position. Lubricant, in the closed position, is allowed to pass through longitudinal grooves 154, 156 and through dwarf grooves 142, 144 and 148 to the circumferential lower grooves 132 and 152.

It will be noted that when the valve is open as in FIGURE 6, a continuous circuit of grooving in the plug and body surfaces surrounds the openings of passage 24 into bore 32, and when the valve is closed as in FIGURE 7, a complete circuit of grooving in the plug and body surfaces surrounds the upstream opening of passage 24 into bore 32.

A further embodiment of the present invention is illustrated in FIGURES 10–12, wherein flow through parallel non-concentric tubing strings 170 and 172 is controlled by separate valve assemblies 174 and 176. Both of the valve assemblies 174 and 176 are identical and the detailed description will be limited to only one but will be equally applicable to both.

Thus, with continued reference to FIGURES 10–12, valve assembly 174 is shown to comprise a valve body 178 having an enlarged central portion 180 integrally interposed between coaxially opposed annular end sections 182 and 184 connecting to tubing string 170 and defining a straight through fluid flow passage 186 extending coaxially with the tubing string. An inverted tapered cross bore 187 open at both ends and intersecting the fluid flow passage 186 at right angles is machined in the enlarged valve body portion 180 and has its longitudinal axis 188 laterally offset with respect to the longitudinal axis 190 of passage 186 outwardly and away from tubing string 172.

Valve body portion 180 is generally conically shaped to correspond to the tapered cross bore 187 and is protuberant with respect to the adjacent end sections 182 and 184 as is commonly provided for in conventional plug valve casings. When separate conventional plug valves having casings of the above-described configuration are used to control fluid flow through parallel non-concentric tubing strings, it will be appreciated that the conventional shape of the valve casings will limit the proximate spacing of the tubing strings.

In accordance with the present invention, a longitudinally extending furrow-shaped recess 192 having a smooth arcuate surface is provided in the side of valve body 178 facing tubing string 172. The center of curvature of recess 192 is designated at 194 and is approximately coincident with the center of tubing string 172, in a horizontal plane passing through the axes of passage 186 and tubing string 172 as viewed from FIGURE 11. Preferably, recess 192 has a greater radius than the outside radius of tubing string 172 so as to provide for a clearance between the wall of recess 192 and the outer periphery of tubing string 172.

Rotatably seated in cross-bore 187 is a tapered valve plug 196 having a diametrical through port 198 shown in its open position in FIGURE 12 and laterally offset with respect to the axis of plug rotation toward the recessed side of valve casing 178. The magnitude which port 198 is offset from the rotational axis of plug 196 is mounted in seating bore 187 and rotated to opened position. By this construction, it will be appreciated that in opened position port 198 provides a smooth uninterrupted flow passage through valve casing 178 to facilitate flow of fluid through tubing string 170.

Since plus seating bore 187 is shifted laterally away from tubing string 172, in accordance with the present invention, and outwardly with respect to the axis of fluid passage 186, the lateral distance indicated at 201 is reduced by a magnitude corresponding to the magnitude by which plug 196 is offset. Thus, by this structure, tubing string 172 can be more closely positioned to tubing string 170 in comparison to conventional plug valve assemblies.

The construction of plug 196 and the lubricating system therefor is identical to the embodiment described in connection with FIGURES 1–9 with two exceptions relating to the construction of the valve plug lubricating system.

As best shown in FIGURE 11, one exception is that valve plug 196 has no circumferential groove adjacent its smaller end as compared to the valve plug 34 of FIGURES 1–9 and the long longitudinal groove 158 is extended to the end of valve plug 196 so that it communicates directly with lubricant chamber 44. Also there is of course no corresponding circumferential body groove 130, upper dwarf grooves 134, 136, 138 and 140, however, being retained and opening at their ends into chamber 44.

The second exception is that plug longitudinal grooves 158 and 154 are spaced apart by an angular magnitude of 104° as compared to the 100° spacing in the embodiment of FIGURES 1–9. Similarly, longitudinal plug groove 156 is spaced 104° from longitudinal plug groove 158. Dwarf grooves 134, 136, 138 and 140 adjacent the smaller end are correspondingly positioned in plug seating bore 187 to align with longitudinal plug grooves 154, 156 and 158 as described in the embodiment of FIGURES 1–9. That is, dwarf grooves 136 and 138 are spaced 104° apart and dwarf grooves 134 and 140 are also spaced 104° apart. Similarly, plug seat dwarf grooves 142, 144, 146, 148 adjacent the larger end of plug 196 are correspondingly angularly spaced apart so that the operation of valve 174 is the same as that of valve 20 of FIGURES 1–9.

Thus, by this structure, it will be appreciated that plug 196 of valve 174 is rotatable through an angular distance of 104° between opened and closed positions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a plug valve assembly characterized by a through passage for fluid flow intersected by a plug seating bore, a ported plug rotatably mounted in said bore for movement between a fully closed position where it blocks fluid flow through said passage and a fully open position where the plug port is aligned with said passage, the axis of rotation of said plug being laterally offset with respect to the axis of said passage, and said plug having a straight through port the longitudinal axis of which is offset with respect to the axis of rotation of said plug to align said port with said passage in valve open position, means providing a body of fluent lubricant in said assembly, a system of grooving in the seating surfaces of said plug and body extending continuously around the intersection of said passage and bore at least at one side of said bore in both fully open and fully closed positions of said plug, said system comprising three circumferentially spaced longitudinal grooves in the plug surface, one of said grooves being larger than the other two and continuously connected in communication with said lubricant body and the other two grooves being disconnected from communication with said lubricant body except in valve open and closed positions of the plug, said other two grooves being disposed at opposite sides of the plug port from each other and being equally circumferentially spaced relative to said longer groove an angular distance greater than 90°, means connecting said system to receive lubricant from said body of fluent lubricant, and means for interrupting the continuity of said system of grooving as the plug is rotating between said positions.

2. In a plug valve assembly characterized by a through fluid flow passage intersected by a plug seating bore having an axis offset laterally with respect to the axis of said passage, a ported plug rotatably mounted in said bore for movement between a fully closed position where the plug blocks fluid flow through said passage and a fully open position where the plug port is aligned with said passage, said plug having a straight through port offset from the axis of said bore so as to align with said passage in valve open position of said plug, means providing a body of lubricant in said bore adjacent one end of the plug in the assembly, a plurality of circumferentially spaced dwarf grooves in the surface of said bore at said one end all in communication with said body of lubricant, a similar plurality of dwarf grooves at the other end of said bore, circumferential grooving in the seating surface of the plug and body at said other end of said bore connecting all of said lower dwarf grooves, and three circumferentially spaced longitudinal grooves on the surface of said plug, one of said longitudinal grooves being long enough to communicate with said body of lubricant in all positions of rotation of said plug and the other two of said grooves being shorter than said one longitudinal groove with both short grooves terminating short of opposite ends of the plug and being adapted to extend between and interconnect aligned pairs of upper and lower dwarf grooves only in the fully open and fully closed positions of the plug, said other two grooves being substantially equally circumferentially spaced from said one groove an angular distance greater than 90° and being disposed at opposite sides of said plug port from each other.

3. In a plug valve assembly characterized by a through fluid flow passage intersected by a plug seating bore having an axis offset laterally with respect to the axis of said passage, a plug having an offset port therethrough rotatably mounted in said bore for movement between a fully closed position where the plug blocks fluid flow through said passage and a fully open position where the plug port is aligned with said passage, means providing a body of lubricant in said bore adjacent one end of the plug in the assembly, four circumferentially spaced dwarf grooves in the surface of said bore at said one end all in communication with said body of lubricant, a similar plurality of dwarf grooves at the other end of said bore, circumferential grooving in the seating surface of the plug and body at said other end of said bore connecting all of said lower dwarf grooves, and three circumferentially spaced longitudinal grooves on the surface of said plug, one of said longitudinal grooves being long enough to communicate with said body of lubricant in all positions of rotation of said plug and the other two of said grooves being shorter than said one longitudinal groove with both terminating short of opposite ends of the plug and being adapted to extend between and interconnect aligned pairs of upper and lower dwarf grooves in the fully open and fully closed positions of the plug, said other two grooves being substantially equally spaced from said one groove an angular distance greater than 90° and being disposed at opposite sides of the plug port from each other, and the circumferential spacing between three successive pairs of said dwarf body grooves being the same and equal to the circumferential spacing between said long plug groove and each of said short plug grooves.

4. In a plug valve assembly characterized by a through fluid flow passage intersected by a plug seating bore having an axis offset laterally with respect to the axis of said passage, a plug having an offset port therethrough rotatably mounted in said bore for movement between a fully closed position where the plug blocks fluid flow through said passage and a fully open position where the plug port is aligned with said passage, means providing a body of lubricant in said bore adjacent one end of the plug in the assembly, four circumferentially spaced dwarf grooves in the surface of said bore at said one end all in communication with said body of lubricant, two of said dwarf grooves being located on the same side of said passage and spaced an angular distance equal to the angle of rotation of the plug between open and closed valve positions, said angle being greater than 90° and the other two dwarf grooves being located at the other side of said passage and spaced less than said distance, a similar plurality of dwarf grooves at the other end of said bore, circumferential grooving in the seating surface of the plug and body at said other end of said bore connecting all of said lower dwarf grooves, and three circumferentially spaced longitudinal grooves on the surface of said plug, one of said longitudinal grooves being long enough to communicate with said body of lubricant in all positions of rotation of said plug and the other two of said grooves being shorter than said one longitudinal groove with both terminating short of opposite ends of the plug and being adapted to extend between and interconnect aligned pairs of upper and lower dwarf grooves in the fully open and fully closed positions of the plug, and said short grooves being circumferentially spaced said angular distance from said long groove and being disposed at opposite sides of said plug bore.

5. In the plug valve assembly defined in claim 4, said plug port being offset in said plug in the opposite direction from the offset of said plug bore axis relative to the passage, and said long groove moving along only a closed surface of said bore during rotation of the plug between fully open and fully closed positions.

6. In a plug valve assembly characterized by a through fluid flow passage intersected by a tapered plug seating bore having an axis offset laterally with respect to the axis of said passage, a tapered plug having an offset port rotatably mounted in said bore for movement between a fully closed position where the plug blocks fluid flow through said passage and a fully open position where the plug port is aligned with said passage, means providing a body of lubricant in said bore adjacent the smaller end of the plug in the assembly, four circumferentially spaced dwarf grooves in the surface of said bore at said smaller end all in communication with said body of lubricant, four similar dwarf grooves at the larger end of said bore, circumferential grooving in the seating surface of said plug and body at said other end of said bore connecting all of said lower dwarf grooves, and three circumferentially spaced longitudinal grooves on the surface of said plug, one of said plug grooves being long enough to communicate with said body of lubricant in all positions of rotation of said plug and the other two of said grooves being substantially equally circumferentially spaced from said one longitudinal groove be an angular distance greater than 90° and being shorter than said one longitudinal groove with both short plug grooves terminating short of opposite ends of the plug and being adapted to extend between and interconnect aligned pairs of upper and lower dwarf grooves in the fully open and fully closed positions of the plug, said plug and dwarf grooves being so circumferentially spaced that in the fully open position of said valve the long plug groove and one short plug groove are so connected with the body grooves as to form a continuous circuit of lubricant around the passage opening into one side of the bore, and in fully closed position of said valve the long plug groove and the other short plug groove are so connected to the body grooves that a complete circuit of lubricant is formed around the passage opening into the other side of the bore.

7. In the plug valve defined in claim 6, said port being offset in said plug in the opposite direction from the offset of said plug axis relative to the passage, and said short plug grooves each being spaced more than 90° from said long plug groove.

8. A tapered plug for use in a lubricated plug valve assembly, said plug having an external surface of revolution about a central axis, a port extending straight through said plug with its axis at right angles to but laterally offset with respect to said central axis, and three longitudinal surface grooves on said plug, two of said grooves being of substantially the same length and shorter than and substantially equidistantly spaced circumferentially from the other longer groove by an angle greater than 90°, one of said short grooves and the longer groove being located adjacent opposite sides of one end opening of the port to said surface, and the other short groove being located adjacent the other end opening of said port and being on the same side as said longer groove, a circumferential groove at the larger end of said plug spaced from all of said longitudinal grooves, and the longer longitudinal groove extending further toward the smaller end of said plug than the shorter grooves.

9. In the plug defined in claim 8, a circumferential groove extending around the small end of the plug connected to the long groove but spaced from the short grooves.

10. In the plug defined in claim 8, said long groove extending to the small end of the plug and said short grooves both terminating short of said small end of the plug.

References Cited by the Examiner

UNITED STATES PATENTS

| 2,145,628 | 1/1939 | Milliken | 137—246.22 X |
| 2,391,278 | 12/1945 | Stark | 251—175 |
| 2,608,374 | 8/1952 | Morehead | 137—246.14 |
| 2,658,713 | 11/1953 | Scherer | 137—246.18 |
| 2,900,995 | 8/1959 | Dickerson et al. | 137—246.18 X |
| 2,931,380 | 4/1960 | Mueller et al. | 137—246.14 |
| 2,997,056 | 8/1961 | Massey | 137—246.15 |

FOREIGN PATENTS 453,188  12/1948  Canada.

WILLIAM F. O'DEA, *Primary Examiner.*

ISADOR WEIL, *Examiner.*

D. ROWE, C. GORDON, *Assistant Examiners.*